US008924333B2

(12) United States Patent
Biem (10) Patent No.: US 8,924,333 B2
(45) Date of Patent: *Dec. 30, 2014

(54) DETECTING ANOMALIES IN REAL-TIME IN MULTIPLE TIME SERIES DATA WITH AUTOMATED THRESHOLDING

(75) Inventor: Alain E. Biem, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 13/558,727

(22) Filed: Jul. 26, 2012

(65) Prior Publication Data

US 2014/0006330 A1   Jan. 2, 2014

Related U.S. Application Data

(63) Continuation of application No. 13/535,743, filed on Jun. 28, 2012.

(51) Int. Cl.
*G06N 5/02* (2006.01)
*G06F 11/00* (2006.01)

(52) U.S. Cl.
USPC .................................... 706/46; 714/100

(58) Field of Classification Search
USPC .............................................. 706/46
See application file for complete search history.

(56) References Cited

U.S. PATENT DOCUMENTS

| 6,225,942 B1 | 5/2001 | Alon |
| 7,483,934 B1 | 1/2009 | Ide et al. |
| 7,546,236 B2 | 6/2009 | Stentiford |
| 7,792,770 B1 | 9/2010 | Phoha et al. |
| 7,853,433 B2 | 12/2010 | He et al. |
| 2008/0201278 A1 | 8/2008 | Muller et al. |
| 2010/0145836 A1 | 6/2010 | Baker et al. |
| 2011/0035188 A1 | 2/2011 | Martinez-Heras et al. |
| 2014/0006325 A1 | 1/2014 | Biem |

FOREIGN PATENT DOCUMENTS

| GB | 2465861 A | 6/2010 |
| WO | WO02/25574 A2 | 3/2002 |
| WO | WO2005109893 A2 | 11/2005 |
| WO | WO2007147166 A2 | 6/2007 |

OTHER PUBLICATIONS

International Search Report and Written Opinion for PCT/US13/45122 dated Jun. 11, 2013, pp. 1-13.

(Continued)

*Primary Examiner* — Alan Chen
(74) *Attorney, Agent, or Firm* — William Stock, Esq.; Blanche E. Schiller, Esq.; Heslin Rothenberg Farley & Mesiti P.C.

(57) ABSTRACT

An approach is provided for detecting an anomaly in a processing environment. The approach includes using a processor to obtain a series of values collected within a processing interval of the processor in the processing environment. The processor normalizes this first series of values to obtain a first series of normalized values. A second series of normalized values is generated by applying a predictive filter to the first series of normalized values. A comparison score is generated from the normalized values by comparing the first series of normalized values and the second series of normalized values. The approach then determines whether the comparison score represents an anomaly relative to at least one other comparison score derived from values collected within the processing interval.

16 Claims, 6 Drawing Sheets

(56) References Cited

OTHER PUBLICATIONS

Teng et al., "Adaptive Real-time Anomaly Detection Using Inductively Generated Sequential Patterns," Proceedings of 1990 IEEE Computer Society Symposium on Research in Security and Privacy, 1990, pp. 278-284.

Bass, Tim, "Intrusion Detection Systems & Multisensor Data Fusion: Creating Cyberspace Situational Awareness," Communications of the ACM, 2000, pp. 100-105.

Balasubramaniyan et al., "An Architecture for Intrusion Detection using Autonomous Agents," Proceedings $14^{th}$ Annual Computer Security Applications Conference, 1998, pp. 1-12.

Hancock, et al., "Multi Agent System for Network Attack Classification Using Flow-based Intrusion Detection," 2011 IEEE Congress on Evolutionary Computation, pp. 1535-1542.

Lane, Terran et al., "Temporal Sequence Learning and Data Reduction for Anomaly Detection," Transactions on Information and System Security, vol. 2, Issue 3, Aug. 1999, pp. 295-331.

Office Action for U.S. Appl. No. 13/535,743 dated Apr. 28, 2014, 16 pages.

DETECTING ANOMALIES IN REAL-TIME IN MULTIPLE TIME SERIES DATA WITH AUTOMATED THRESHOLDING

This application is a continuation of co-pending U.S. Ser. No. 13/535,743, entitled "DETECTING ANOMALIES IN REAL-TIME IN MULTIPLE TIME SERIES DATA WITH AUTOMATED THRESHOLDING," filed Jun. 28, 2012, which is hereby incorporated herein by reference in its entirety

BACKGROUND

An aspect of the technique relates to detecting anomalies in a processing environment.

Large-scale hosting infrastructures and platforms form many processing environments, including computer systems used in cloud computing and enterprise data centers. The size of these computer systems, the number of transactions that are performed by the systems, and the large amount of data processed, render these systems vulnerable to anomalies. An anomaly is an unexpected change in incoming data or a pattern in the incoming data that deviates from the expected behavior. Anomalies arise from, for example, bottlenecks, memory leaks, hardware failures, etc.

Monitoring data on complex computer systems for anomalies and recognizing anomalies in real-time prevents such anomalies from accumulating and affecting the efficiency of the system and, in a worst case scenario, causing the system, or a portion of the system, to fail.

BRIEF SUMMARY

Shortcomings of the prior art are overcome and additional advantages are provided through the provision of a computer program product for detecting an anomaly in a processing environment. The computer program product includes, for instance, a computer readable storage medium readable by a processing circuit and storing instructions for execution by the processing circuit for performing a method including: obtaining, by a processor, a series of values collected within a processing interval of the processor of the processing environment; normalizing, by the processor, the series of values to obtain a first series of normalized values; generating a second series of normalized values by applying a predictive filter to the first series of normalized values; generating a comparison score by comparing the first series of normalized values to the second series of normalized values; and determining whether the comparison score represents an anomaly relative to at least one other comparison score derived from values collected within the processing interval.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

The technique represents an improvement over prior systems and methods for anomaly detection because it detects anomalies in real-time and does not utilize foundational data, such as a pre-established predictive model, and/or training data. Present anomaly detection solutions require foundational data before they are able to detect anomalies. Some detection solutions require the implementation of a model that defines what constitutes an anomaly within that computer system. Other detection solutions require "training data," data that teaches a system what characteristics in data constitute anomalies. The adaptive qualities of aspects of the present invention allow it to begin detecting anomalies in real-time without foundational data.

Figure 1:
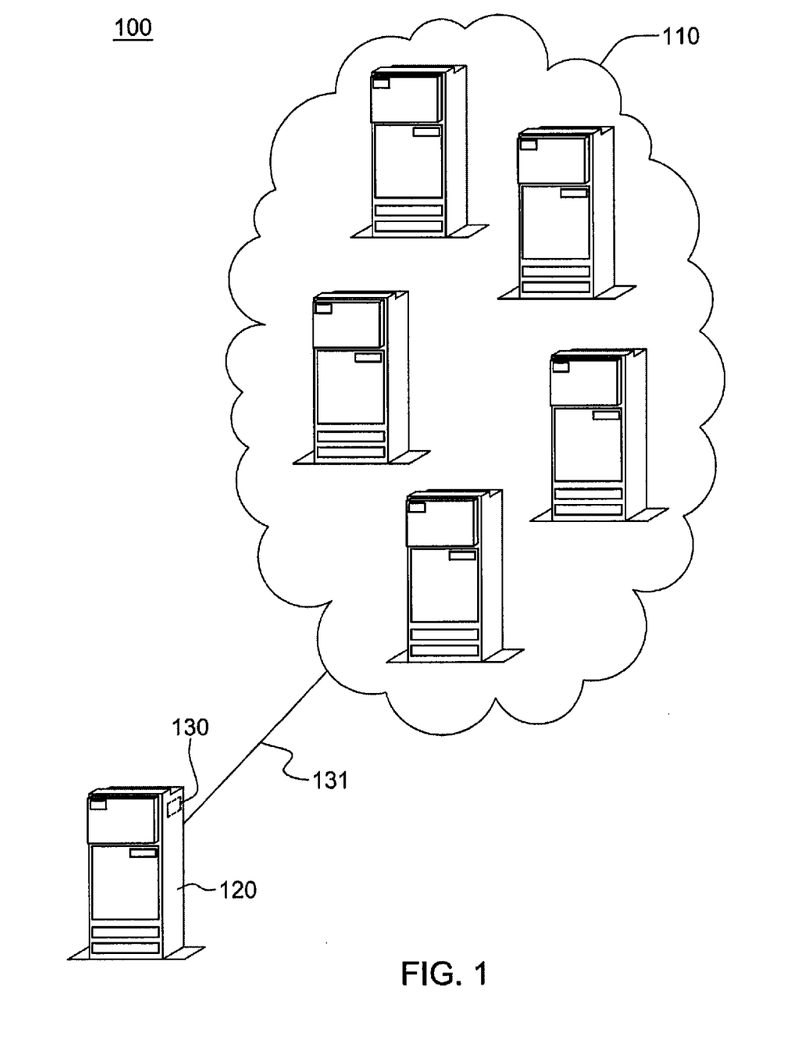
FIG. 1 depicts one example of a computing environment used to execute one or more aspects of an embodiment of the present invention.

FIG. 1 depicts a technical architecture 100 of an embodiment of the technique. In this embodiment, a computer system 110, which can include a cloud and/or an enterprise system, is being monitored by a server 120, which is connected to the computer system 110 via a network connection 131. This network connection 131 includes, but is not limited to, a wireless and/or a wired connection. The anomaly detection software is being executed by one or more processors (not pictured) on the server 120. In further embodiments of the technique, the anomaly detection software is executed on a resource of the computer system 110 itself. In a further embodiment of the technique, the execution of the software is distributed on one of more resources external and/or internal to the computer system 110. At least one sensor 130 within the server, in this embodiment, receives data in a time series from a resource within the computer system 110. In embodiments where the computer system 110 is a cloud or an enterprise computing system, the at least one sensor 130 receives multiple time series data as this data is received from more than one resource. In further embodiments, the one or more sensor 130 is located internal and/or external to the computer system 110.

Figure 2:
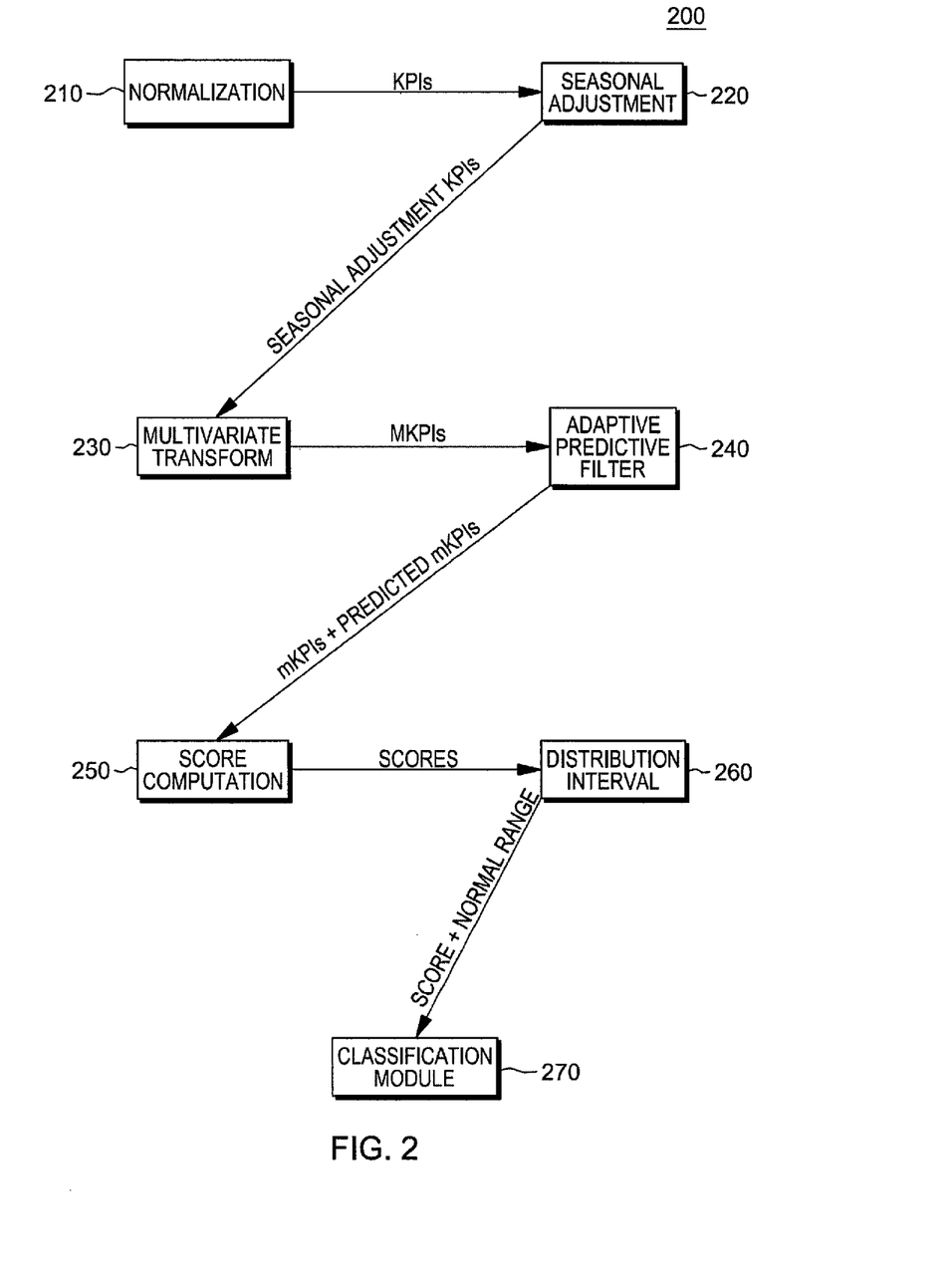
FIG. 2 depicts one embodiment of the logic used to execute a process that includes one or more aspects of an embodiment of the present invention.

Referring to FIG. 2, a diagram 200 of the modules of an embodiment of the anomaly detection system of the technique is provided. In this embodiment, a series of modules is employed to determine whether an anomaly is present in a processing environment. The technique evaluates whether or not given data in a time series in a computer system contains an anomaly. The modules include, but are not limited to: 1) a normalization module 210; 2) a seasonal adjustment module 220; 3) a multivariate transform module 230; 4) an adaptive predictive filter 240; 5) a score computation module 250; 6) a distribution interval module 260; and 7) a classification module 270. Together, these modules execute adaptive logic to adjudge whether data in a sequence (time series) contains an anomaly. By establishing and adjusting key performance indicators (KPIs), in a time series, the technique ultimately determines whether data in a time series is indicative of a system anomaly.

The technique ultimately evaluates a comparison score, a score that represents the difference between an expected data value and an actual data value at a given time. By comparing this comparison scores to comparison scores that are computed in a computer system during a similar time period, the technique determines whether a system anomaly has occurred during the time represented by the comparison score.

The separation of individual tasks into modules in the embodiment of FIG. 2 is a non-limiting example of process distribution and is not indicative of the structure of the computer program code or of where this code is executed. One of skill in the art will recognize that the functionality of the computer program code can be embodied in one or more physical modules and executed on one or more processors, in one or more computing resources. FIG. 2 is provided for illustrative purposes to designate different activities within the method, executed by a special configured computer system, and/or embodied in a computer program product.

Referring the FIG. 2, the normalization module 210 is utilized to incrementally normalize transactional data, provided from multiple sources in the computer system 110 in time series for either a predetermined amount of time, or continuously. A time series is a sequence of data points, measured typically at successive time instants spaced at uniform time intervals.

The normalization module 210 monitors the data in a time series handled by the computer system and, in real-time to establish mean values and a standard deviation from the mean values, i.e., key performance indicators (KPIs). Each KPI represents characteristics of data in a time series at a given time (t). The longer the normalization module 210 is active, the more accurate the mean and standard deviation become.

In accordance with an aspect of the present invention, training data or a data model to identify an anomaly. Instead, the normalization module 210 and other modules of the system are adaptive meaning that these modules change their behavior based on the resources available. Thus, as the patterns in the data received change, the normalization module 210 adapts. As data accumulates over time, the accuracy of the system increases. Specifically, what may be viewed initially as an anomaly when the program is initiated, will later be revealed to be a deviation that is not abnormal. The outputs of the normalization module 210 are normalized KPIs. Each normalized KPI represents values related to data in a time series received by a sensor 130 at a given time (t).

In the embodiment of FIG. 1, the normalization process commences in the computer system 110 as soon as data becomes available from at least one sensor 130. The time series is represented by $x_t = (x_t(1) \ldots x_t(n))$, where t increases indefinitely over time; the dimension of n represents the total number of time being monitored at a given time. The components of x are heterogeneous when each sensor collects various data from various parts of the system. In an embodiment of the technique, time series of data is normalized to a KPI utilizing the following Equation 1. Each incoming sample $x_t$ is normalized in real time as follows:

$$z_t = \Sigma_t^{-1}(x_t - \mu_t) \quad (1)$$

The means $\mu_t$ and covariance matrix $\Sigma_t$ (assumed to be diagonal) at time at t are also incrementally estimated as:

$$\mu_t = \mu_{t-1} + \frac{x_t - \mu_{t-1}}{t} \quad (2)$$

$$\Sigma_t = \frac{t}{t-1}\Sigma_{t-1} + \text{Diag}\left[\frac{(x_t - \mu_{t-1})(x_t - \mu_{t-1})^T}{t}\right] \quad (3)$$

where "Diag" refers to the diagonal operator (the operator that extracts the diagonal of a matrix) and T is the transpose operator. In an embodiment of the technique, it is desirable to stop the incremental estimate of means and covariances at some specified period of time to avoid normalizing in an anomalous area.

Returning to FIG. 2, the seasonal adjustment module 220 is depicted. The seasonal adjustment module 220 assists in anomaly detection when seasonal data patterns affect the data in the time series, when compared to a time series received at a different time. In some embodiments, the user inputs seasonal data patterns into the system so that any anomalies in the data that can be attributed to these patterns can be extracted from the time series data and the KPIs. In embodiments of the technique where seasonal factors do not affect data, this module is excluded and/or bypassed.

Entering seasonal data patterns into the system potentially eliminates some false anomaly results. For example, while 100 transactions in a given system may be normal at 2 am on a Sunday, this low number could indicate an issue at 2 pm on Monday. If entered, seasonal data representing this condition would eliminate a false anomaly result when the number of transactions processed on a Sunday morning, for example, is far less than expected on a Monday afternoon. Thus, in a computer system where time series data varies wildly in accordance with seasonal usage patterns, the seasonal adjustment module 220 is useful because what might be identified as an abnormal data pattern at a given time, may actually be normal for the time due to seasonal factors. Thus, false anomaly results are reduced through the inclusion of this module. Eliminating seasonal influences increases the accuracy of the data.

Along with seasonal factors, another factor that can affect the KPI values is the resource within the computer system 110 that produced the time series data. The actual value of the KPI can be misleading as the power and features of the computing resources vary across a computer system 110, such as a cloud, or an enterprise computing environment. Thus, to eliminate the effects of these outside factors, the KPI is further adjusted through a multivariate transform in the multivariate transform module 230 of FIG. 2.

The multivariate transform module 230 converts each KPI to a multivariate KPI (mKPI) by applying a transform, as indicated below. The transform moves each KPI calculated by the normalization module 210 into a new space that is more amenable to anomaly tracking. The multivariate transform module 230 reduces the actual dimensions of the KPI by transforming the original metrics into an mKPI for each time in the time series.

Thus, rather than use the KPI, which is a view of time series data in the space of the resource from which it originated, this time series data, once the KPI is converted to an mKPIs, is viewed and understood in the context of the computer system 110 as a whole. In this space, the movement and patterns of the data from a given time series, regardless of the resource in the computer system 110 from which they originate, are more readily apparent.

In a computer system without specifications discrepancies between the resources, the outside factors that this module seeks to eliminate are less likely to occur. Thus, an embodiment of the technique without this module can signal an anomaly in the processing environment.

Techniques of deriving the mKPI from the KPI include but are not limited to Discrete Cosine Transform (DCT), Discrete Wavelet Transform (DWT), a multi-dimensional to multi-dimensional mapping, and/or a statistically-estimated transform, such as Principal Component Analysis (PCA). Like the KPI, the mKPI also represents characteristics of data in a time series at a given time (t).

In an embodiment of the technique where the multivariate transform module 230 utilizes DCT to derive the mKPI values at each time in the time series, the transform produces the value below. In this example, $z_t$ is the normalized value derived in equation 1, $y_t$ represents the transformed value.

$$y_t = DCT(z_t) \quad (4)$$

In the embodiment of FIG. 2, once an mKPI is derived, this multivariate transform is passed to the adaptive predictive filter module 240. This module utilizes a predictive filter, also referred to as an adaptive predictive filter because the intelligence increases as this filer evaluates more data from a given computer system.

By applying a logical derivation to an mKPI, the adaptive predictive filter module 240 takes an mKPI for a given time and predicts the next mKPI at the next time in the time series. Given a first mKPI for a first time (t), the adaptive predictive filter module 240 predicts the mKPI at a second time, for example, t+5 minutes. The predicted mKPI at the second time is later compared to the actual mKPI at that second time, which is received from the multivariate transform module 230. For each t and corresponding mKPI, the adaptive predictive filter module 240 calculates a predicted mKPI at the next time (t+x). If there are ten times in a given time series, and therefore 10 mKPI values, the adaptive predictive filter module 240 predicts a next value for each of the 10 mKPI values. In some embodiments of the technique, the predictive filter module 240 also estimates the variance around each predicted value.

For each data point entered into the adaptive predictive filter, the filter can predict the data at a later point in time. For example, if ten values are entered into the predictive filter from 10:00 am, ten results will be produced, ten predicted values for a later time, for example, 10:05 am.

The filters utilized in the adaptive predictive filter module 240 in various embodiments of the technique include, but are not limited to, Kalman filter, Faded-Polynomial memory filter, and/or auto-regressive filter (AR), a one-step ahead predictor and variants thereof. The filters are recursive and do not operate in batch mode. Instead, each filter utilizes the result from the previously predicted mKPI and the new mKPI to predict the next mKPI. As with the normalization module 210, the predictions of the adaptive predictive filter module 240 improve as more data is supplied.

An embodiment of the technique utilizes a Fading-Memory Polynomial Filter (FMP) in the adaptive predictive filter module 240.

The variables derived in equations 1 and 4 are repeated in the equation below. In this embodiment, in the FMP $y_t$, the transformed value from equation 4, represents one of the components of multivariate vector $y_t$ at time t and $\epsilon_t$ is an estimate of prediction error measured at time t for component $y_t$.

$$\epsilon_{t-1} = y_{t-1} - \hat{y}_{t-1} \quad (5)$$

where $\hat{y}_t-1$ is the predicted sample at time t−1, after observing data up to time t−2. The variable $\hat{y}'_t$ denotes the first order estimated derivate of $\hat{y}_t$ and θ be a parameter that effectively defines the time constant of the FMP filter. The expected sample $\hat{y}_t$ at time t−1 is estimated as follows:

$$\begin{bmatrix} \hat{y}_t \\ \hat{y}'_t \end{bmatrix} = \begin{bmatrix} 1 & 1 \\ 0 & 1 \end{bmatrix} \begin{bmatrix} \hat{y}_{t-1} \\ \hat{y}'_{t-1} \end{bmatrix} + \begin{bmatrix} 2(1-\theta) \\ (1-\theta)^2 \end{bmatrix} \epsilon_{t-1} \quad (6)$$

The filter produces an estimate of the expected value $\hat{y}_t$ and the estimates of the variance $\sigma_t^2$ around that expected value.

In the embodiment of FIG. 2, once the variance between the predicted mKPI at each time (t) and the actual mKPI at that t is understood for a time series with a given number of times, a comparison score is computed with the score computation module 250. This comparison score, also called a detection score, is computed by the score computation module 250 from the residuals derived from the difference between the predicted value from the adaptive predictive filter module 240 and the actual value on a per mKPI basis. Various embodiments of the technique utilize varied methods to compute these scores, which include but are not limited to, averaging the residuals, finding the median of the residuals, finding the geometric average of the residuals, and/or computing a weighted value for any or all of these enumerated methods.

An embodiment of the score computation module 250 of the technique utilizes the computation below to compute a comparison score. It is typical to produce a comparison score based on the $x^2$ statistics defined at:

$$x^2 = \sum_{i=1}^{n} \frac{\epsilon_t^2(i)}{\hat{y}_t(i)} \quad (7)$$

The variable in the above equation were derived and references in equations 1-6. In a further embodiment of the technique, the comparison score is calculated using a calculation that captures the changes in behavior of the time series across various dimensionality. Below is a dimension-robust statistic that enables the capture of changes in behavior across various dimensionalities:

$$S^2 = \frac{\sum_{i=1}^{n} i \frac{\epsilon_t^2(i)}{\hat{\sigma}_{t(i)}^2}}{\sum_{i=1}^{n} i} \quad (8)$$

$$= \frac{2}{n(n+1)} \sum_{i=1}^{n} i \frac{\epsilon_t^2(i)}{\hat{\sigma}_{t(i)}^2} \quad (9)$$

The comparison score of an mKPI at a given time in a time series does not alone indicate whether the corresponding data represents a system anomaly. Returning the FIG. 2, after it is computed, the comparison score, is interpreted to determine whether this quantitative score represents a data anomaly in the given computer system 110 or not. To aid in this interpretation, the embodiment of FIG. 2 employs a distribution interval module 260. The distribution interval module 260 accumulates comparison scores over a period of time and determines what range of values constitute the normal value region for comparison scores that are generated during a predetermined period of time, i.e., a value range representing normal processing activity.

In an embodiment of the technique, after being assigned, the distribution interval module 260 buckets the scores in a memory resource accessible to the distribution interval module 260. The scores combined in the same bucket are those collected over a predetermined time interval. In an embodiment of the technique, the size of this bucket, or rather, the interval of time for which the bucket will collect comparison scores, is configurable by the user. In another embodiment of the technique, the bucket size is based upon the fault tolerance of the computer system.

The bucket in this distribution interval module 260 collects scores over the course of a predetermined time interval. For example, in an embodiment of the technique, each bucket constitutes a half hour of time that the computer system is up and running. After collecting scores over the predetermined time interval, the distribution interval module 260 calculates the first quartile, second quartile, third quartile, and median of the scores, in real time, establishing through the collection of data over time, what is "normal" and what is "abnormal" within the scores and therefore, within the time series data. However, because the calculations are occurring in real time, there is never a time when a normal value range does not exist, this range just changed and adapts as more data accumulates during the predetermined time bucket. As the data comes in, the module continuously computes the first upper outlier, the lower outlier, and the inter-quartile interval, the interquartile range (IQR), the distance between the first and third quartiles. In an embodiment of the technique, the normal value range is the area between the highest outlier minus the standard deviation from the mean and the lowest outlier plus the standard deviation from the mean.

In an embodiment of the technique, the classification module 270 returns a result indicating that an anomaly has occurred when the incoming sample falls outside of a normal value range, which is defined by the outliers computed in the distribution interval module 260. The bounds of this range can be referred to as thresholds. For example, a comparison score can be flagged as indicating an anomaly when it falls above the highest first outlier, below the lowest first outlier, and/or when the distance from the mean the score is higher than one and a half (1.5) times the standard derivation. Utilizing these thresholds established by the distribution interval module 260, the classification module 270 determines whether there is an anomaly.

Figure 3:
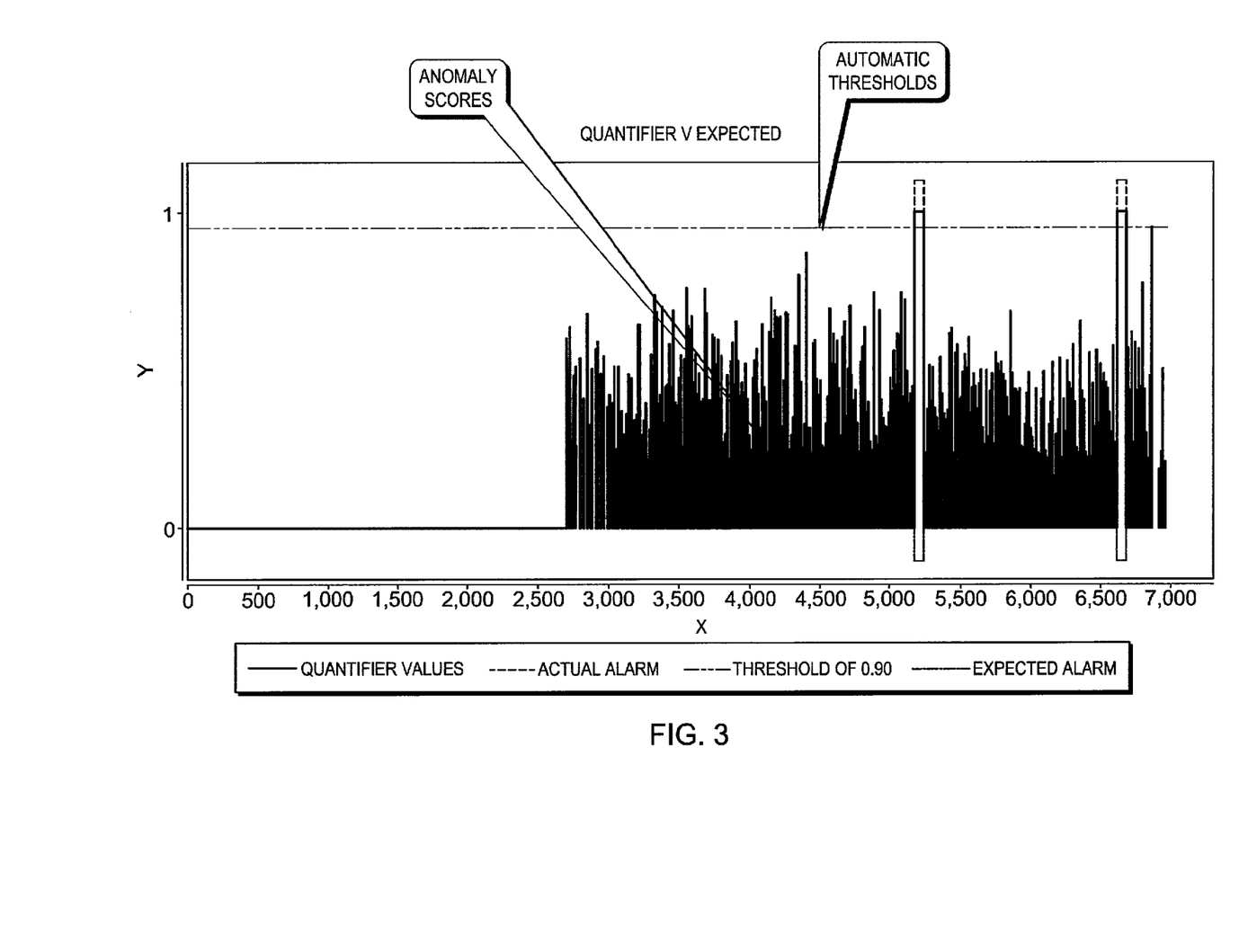
FIG. 3 depicts a graph illustrating a calculated normal value range used to determine whether a comparison score represents an anomaly.

FIG. 3 is a graphical representation of comparison scores charted in a given interval and compared to the upper threshold of the determined normal value range. As represented in FIG. 3, the charted comparison scores are derived by comparing the actual mKPI at each time position in the series to the predicted mKPI for the same position in the series. When the threshold of the normal value range is exceeded, the data at the point in the series corresponding with that comparison score constitutes an anomaly.

Returning to FIG. 2, In an embodiment of the technique, the classification module 270 returns a value "1" to represent an anomaly found in the data and the value "0" to represent that no anomalies were found in the data.

Figure 4:
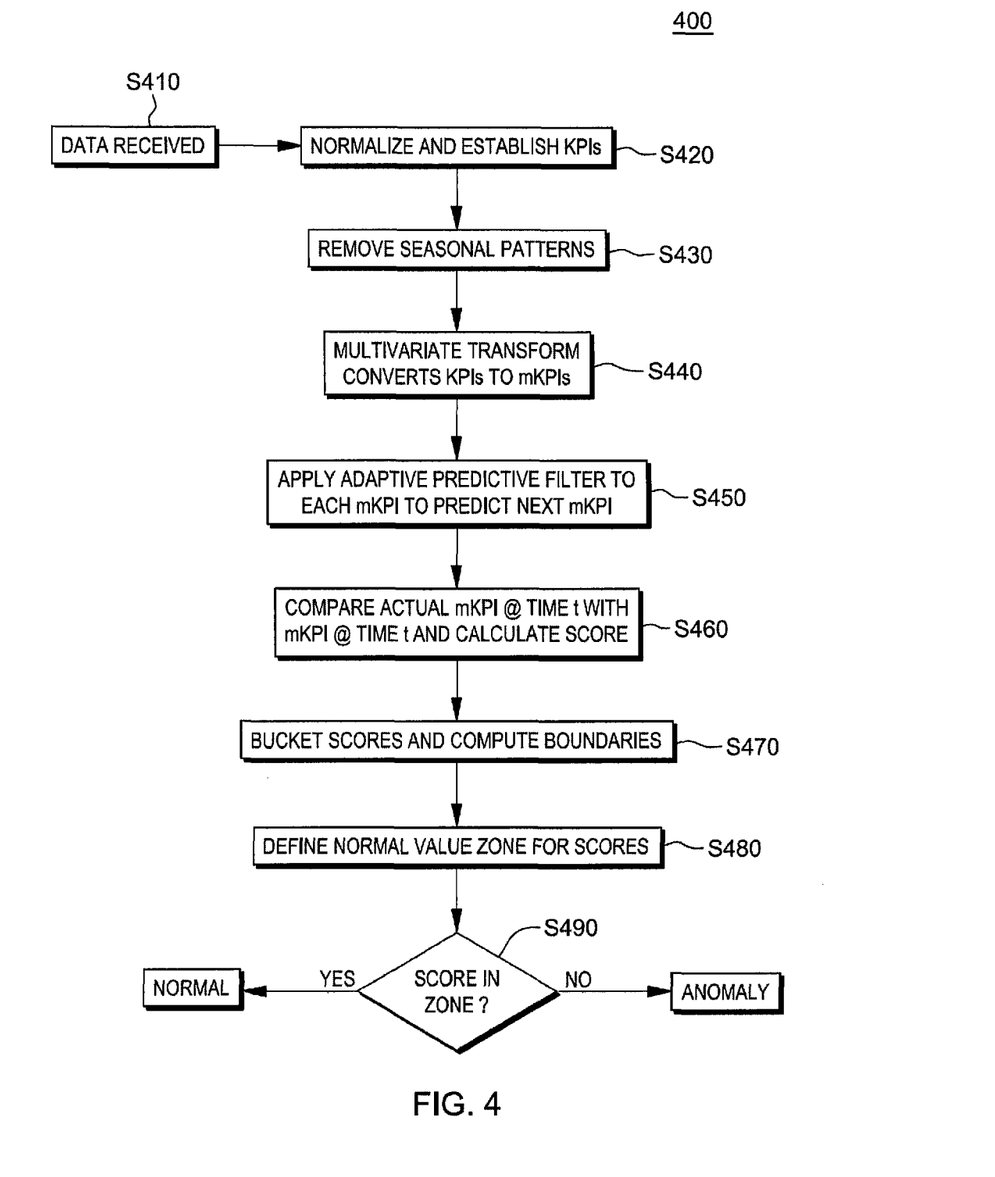
FIG. 4 depicts a workflow of one embodiment of a method for detecting an anomaly in a processing environment, in accordance with one or more aspects of the present invention.

FIG. 4 is a workflow 400 of an embodiment of the technique. This workflow 400 includes the removal of seasonal factors from the data and the use of a multivariate transform, which, as described earlier, are utilized dependent upon the characteristics of the processing environments being monitored.

The workflow 400 is included to highlight that the activities that comprise the transformation of the data and the determination of whether specific data constitutes an anomaly are not tied to specific modules. FIG. 2 is an example of a possible program model. The workflow 400 depicts an embodiment the logic of an aspect of the technique in a non-modular model.

Referring to FIG. 4, first, one or more sensors 130 receive time series data (S410). This data is normalized to establish individual KPIs for data at given points in time in the series (S420). The seasonal patterns are removed from the KPIs (S430). Once the seasonal data is removed, the KPIs undergo a multivariate transform so that data can be seen in the context of the system as a whole and not the individual element of the computer system 110 that generated the data. To move the KPIs to a new space, the KPIs are converted to mKPIs (S440).

The mKPI at a given time is filtered using an adaptive predictive filter to predict the mKPI at a next time in the time series (S450). The adaptive filter is used to predict a next mKPI for each data point. The actual mKPIs for a time are compared with the adaptive filter predicted time for the same time to establish a comparison score (S460). Comparison scores are accumulated over a predefined period of time and during this accumulation, the scores are classified as belonging to the first quartile, the second quartile, and the third quartile. The median, the first upper outlier, the lower outlier, and the inter-quartile interval, are computed (S470). Criteria for a normal zone is defined (S480). As the accumulation of score is ongoing, the metes and bounds of the zone are established with more data as the time period progresses.

While scores are accumulated and used to establish threshold values, incoming comparison scores are classified as normal or as anomalies. The accuracy of the system increases as more mKPIs are accumulated, but the determinations are made in real time. Each comparison score is compared to the normal zone (S490) and if the score falls within the zone, a result representing that the data is normal is returned. If the score falls outside the zone, a result representing that the data contains an anomaly is returned.

Figure 5:
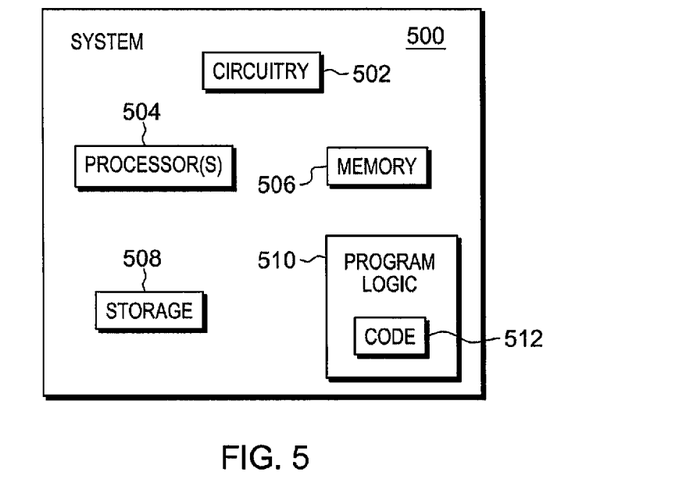
FIG. 5 depicts one embodiment of a single processor computing environment to incorporate and use one or more aspects of the present invention.

FIG. 5 illustrates a block diagram of a resource 500 in computer system 110 and/or server 120, which is part of the technical architecture of certain embodiments of the technique. The resource 500 may include a circuitry 502 that may in certain embodiments include a microprocessor 504. The computer system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Figure 6:
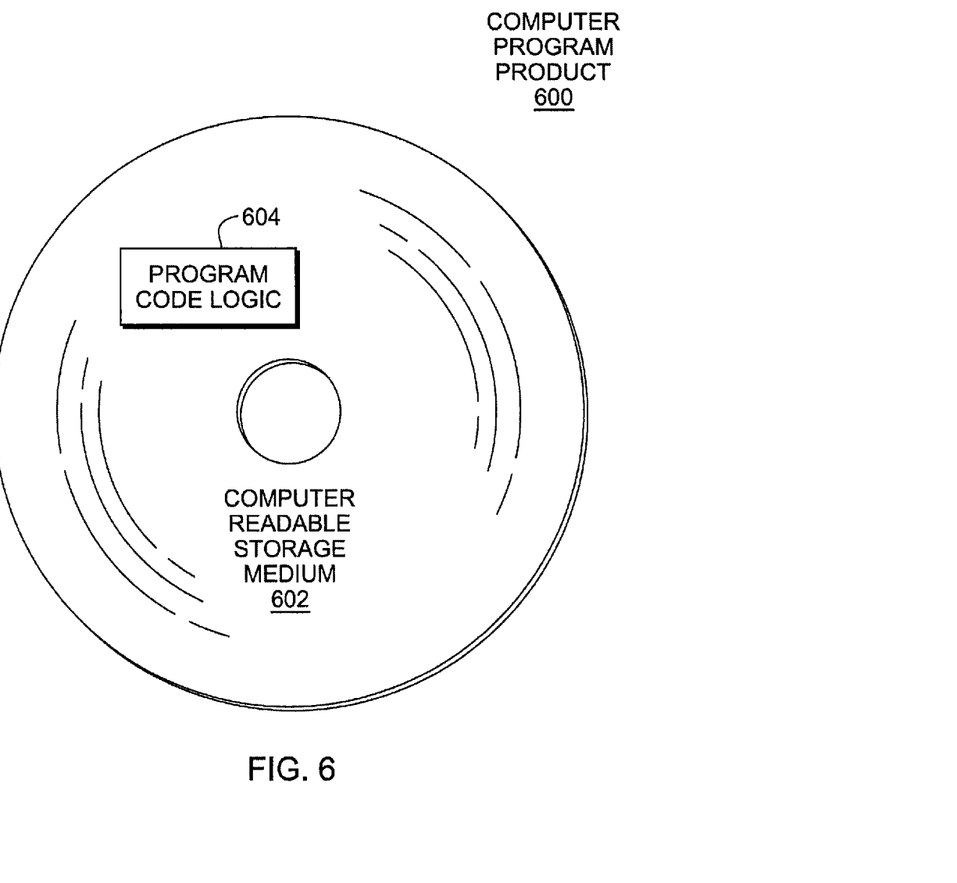
FIG. 6 depicts one embodiment of a computer program product incorporating one or more aspects of the present invention.

Using the processing resources of a resource 500 to execute software, computer-readable code or instructions, does not limit where this code is can be stored. Referring to FIG. 6, in one example, a computer program product 600 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for detecting an anomaly in a processing environment, the computer program product comprising:

a computer readable storage medium readable by a processing circuit and storing instructions for execution by the processing circuit for performing a method comprising:

obtaining, by a processor, a series of values collected within a processing interval of the processor of the processing environment, wherein the values comprise transactional data provided from more than one source in the processing environment;

normalizing, by the processor, the series of values to obtain a first series of normalized values;

generating a second series of normalized values by applying a predictive filter to the first series of normalized values, wherein each normalized value in the second series of normalized values comprises a predicted value based on a value in the first series of normalized values, predicted at a later time in the processing interval, by utilizing the predictive filter;

generating a comparison score by comparing the first series of normalized values to the second series of normalized values; and determining whether the comparison score represents an anomaly relative to at least one other comparison score derived from values collected within the processing interval.

2. The computer program product of claim 1, wherein the first series of normalized values and the second series of normalized values are time-ordered and a first position in the second series of normalized values has the same time as a second position in the first series of normalized values, and the first position precedes the second position by one position, and wherein the generating the comparison score comprises:

comparing at least one value with a given time position from the first series of normalized values to at least one other value with the given time position from the second series of normalized values.

3. The computer program product of claim 1, wherein the determining further comprises:

applying an inter-quartile estimator to the comparison score and the at least one other comparison score; and utilizing the results from the inter-quartile estimator, establishing a value range representing normal processing activity wherein the to at least one other comparison score is located in this value range.

4. The computer program product of claim 1, wherein the method further comprises:

applying a multivariate transform to the first series of normalized values to remove unwanted characteristics specific to the processing environment, wherein said application standardizes the first series of normalized values for application of the predictive filter.

5. The computer program product of claim 1, wherein the processing interval is configurable.

6. The computer program product of claim 1, wherein the comparison score comprises one of: an average of the difference between the first normalized series and the second normalized series, a median of the difference between the first normalized series and the second normalized series, a geometric average between the first normalized series and the second normalized series, a weighted average between the first normalized series and the second normalized series.

7. The computer program product of claim 1, wherein the predictive filter comprises one of: a Kalman filter, a faded-polynomial memory filter, an auto-regressive filter, a one-step ahead predictor.

8. The computer program product of claim 4, wherein the multivariate transform utilizes one of: a Discrete Cosine Transform, a Discrete Wavelet Transform, a statistically estimated transform of a Principal Component Analysis, a multi-dimensional to multi-dimensional mapping.

9. A computer system for detecting an anomaly in a processing environment, the computer system comprising:

a memory; and a processor in communications with the memory, wherein the computer system is configured to perform a method, said method comprising:

obtaining, by a processor, a series of values collected within a processing interval of the processor of the processing environment, wherein the values comprise transactional data provided from more than one source in the processing environment;

normalizing, by the processor, the series of values to obtain a first series of normalized values;

generating a second series of normalized values by applying a predictive filter to the first series of normalized values, wherein each normalized value in the second series of normalized values comprises a predicted value based on a value in the first series of normalized values, predicted at a later time in the processing interval, by utilizing the predictive filter;

generating a comparison score by comparing the first series of normalized values to the second series of normalized values; and determining whether the comparison score represents an anomaly relative to at least one other comparison score derived from values collected within the processing interval.

10. The computer system of claim 9, wherein the first series of normalized values and the second series of normalized values are time-ordered and a first position in the second series of normalized values has the same time as a second position in the first series of normalized values, and the first position precedes the second position by one position, and wherein the generating the comparison score comprises:

comparing at least one value with a given time position from the first series of normalized values to at least one other value with the given time position from the second series of normalized values.

11. The computer system of claim 9, wherein the determining further comprises:

applying an inter-quartile estimator to the comparison score and the at least one other comparison score; and utilizing the results from the inter-quartile estimator, establishing a value range representing normal processing activity wherein the to at least one other comparison score is located in this value range.

12. The computer system of claim 9, wherein the method further comprises:

applying a multivariate transform to the first series of normalized values to remove unwanted characteristics specific to the processing environment, wherein said application standardizes the first series of normalized values for application of the predictive filter.

13. The computer system of claim 9, wherein the processing interval is configurable.

14. The computer system of claim 9, wherein the comparison score comprises one of: an average of the difference between the first normalized series and the second normalized series, a median of the difference between the first normalized series and the second normalized series, a geometric average between the first normalized series and the second normalized series, a weighted average between the first normalized series and the second normalized series.

15. The computer system of claim 9, wherein the predictive filter comprises one of: a Kalman filter, a faded-polynomial memory filter, an auto-regressive filter, a one-step ahead predictor.

16. The computer system of claim 12, wherein the multi-variate transform utilizes one of: a Discrete Cosine Transform, a Discrete Wavelet Transform, a statistically estimated transform of a Principal Component Analysis, a multi-dimensional to multi-dimensional mapping.

* * * * *